Dec. 30, 1958 M. BOVARNICK 2,866,783
GLUTAMIC AND ASPARTIC ACID POLYPEPTIDE POLYMERS
AS PLASMA VOLUME EXTENDERS
Filed July 5, 1956
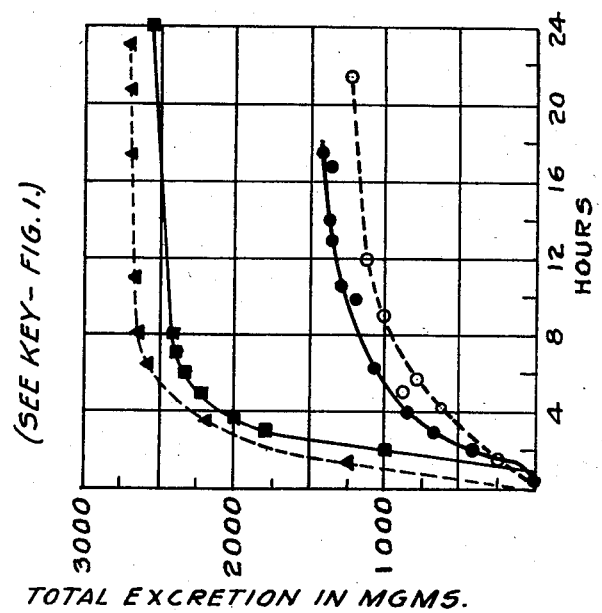
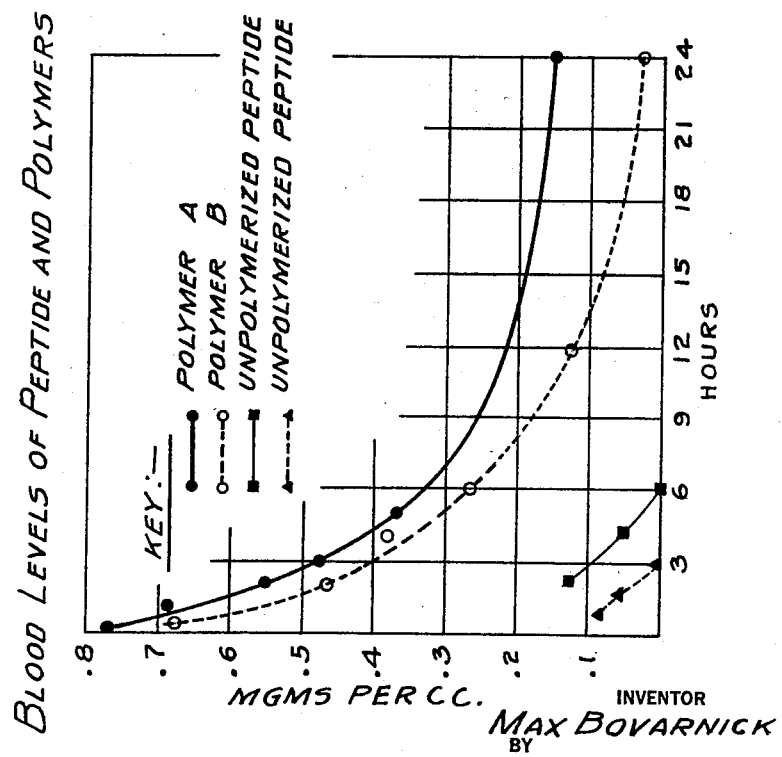
INVENTOR
MAX BOVARNICK
BY
ATTORNEY

United States Patent Office 2,866,783
Patented Dec. 30, 1958

2,866,783

GLUTAMIC AND ASPARTIC ACID POLYPEPTIDE POLYMERS AS PLASMA VOLUME EXTENDERS

Max Bovarnick, Brooklyn, N. Y.

Application July 5, 1956, Serial No. 596,811

10 Claims. (Cl. 260—112)

(Granted under Title 35, U. S. Code (1952), sec. 266)

The invention described herein may be manufactured and used by or for the Government of the United States for governmental purposes without the payment to me of any royalty thereon in accordance with the provisions of the Act of April 30, 1928 (ch. 460, 45 Stat. L. 467).

This invention relates to polypeptides and to polymers and derivatives thereof suitable for use as blood plasma volume extenders, blood substitutes, and for analogous purposes involving blood chemistry, or for use as intermediates in the preparation of compounds for these purposes, and to methods for preparing and using these compounds. This application is a continuation-in-part of my application, Serial No. 365,302, filed June 30, 1953, entitled "Preparation and Use of Glutamic Acid Polypeptide Polymers as Plasma Volume Extenders," and now abandoned.

There is an immediate and urgent need for a synthetic blood plasma extender for treatment of battle casualties and other injuries sustained by members of the armed forces, and also for treatment of others injured, suffering from shock, or depleted of blood below the normal volume in the circulatory system. Adequate supplies of natural blood plasma are difficult to obtain, and the preservation and handling of such material without deterioration presents many problems. The desirability of replacing the natural plasma with a suitable synthetic substitute is readily apparent.

A blood plasma volume extender (blood substitute) should be a material which when injected into the blood stream will exert an oncotic pressure or colloid osmotic pressure and extend or increase blood volume. It should have a substantial half life in the blood stream, should be non-toxic, non-antigenic and non-pyrogenic. It should be within acceptable limits of viscosity, and should not affect the formed elements of the blood, or affect any physiological systems or organs in an unacceptable fashion. It should, if possible, be metabolizeable and serve as a source of food and energy. In addition, it should be stable in solution, and be preservable over long periods of time.

An object of this invention is to provide novel polypeptides of polycarboxylic amino acids, and polymers, and derivatives thereof having properties satisfying the foregoing criteria for blood plasma substitutes or extenders, and to provide methods for producing these compounds.

Another object of this invention is to provide novel conjugated polypeptides of polycarboxylic amino acids having molecules of such size and configuration that they will remain in the circulatory system for a useful period of time when injected therein as a blood plasma extender.

Another object of this invention is to provide novel conjugated polypeptides of polycarboxylic amino acids having ionizable groups on the surface of the molecules whereby the oncotic efficiency of the material in the blood stream is high.

These and other objects are accomplished by this invention which, in general, comprises preparing a suitable long chain polypeptide, and attaching suitable side chains to the backbone chain. Long-chain polypeptides of such polycarboxylic acids as amino malonic acid, aspartic acid, glutamic acid, hydroxy glutamic acid, alphaamino adipic acid, etc., may be utilized for the purposes of this invention either as the backbone or side chains or for both. Polypeptides of such polyamino acids as poly-lysine, poly-ornithine, etc., may be used as the backbone material. The preferred backbone material is a long-chain polypeptide of glutamic acid. A suitable starting backbone chain comprises a glutamyl polypeptide having an average molecular weight within the range of about 45,000 or above. This material may be chemically represented as follows:

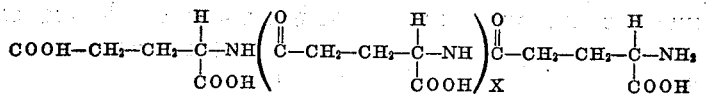

in which X, for example, may be about 400.

In accordance with this invention side chains are attached by peptide linkage to a backbone chain, as represented above, which by properly affecting the molecular dimensions and surface configuration, make the molecule large enough so that it will not leak out of the blood stream through the capillaries into the tissue spaces too rapidly, but will, by remaining in the blood stream, exert colloidal osmotic or oncotic pressure, drawing fluid from the tissue into the blood stream and in this way further extend the plasma volume. Similar considerations as pertain to diffusion through the capillary wall apply to excretion in the urine.

The ability of a molecule to draw water from the tissues into the blood stream and thus extend the plasma volume is measured in terms of its oncotic efficiency. The greater the oncotic efficiency of a substance, the better it is as a blood substitute. The oncotic efficiency of any large molecule is increased by the presence of ionizing groups on its surface by virtue of so-called "Donnan" effects. A further feature of this invention comprises the selection of materials for side chains which possess or are capable of producing in the process a large number of ionizable groups. For this purpose, materials such as salts of glutamyl polypeptide, or of aspartyl polypeptides, all of which have large numbers of ionizable groups, are especially desirable as side chains.

It will be understood from the foregoing that the invention contemplates not only increasing the size of the molecule to a suitable dimension but also effecting this change by a means which simultaneously preserves its high oncotic efficiency.

A further consideration in the development of a blood plasma volume extender is the desirability of its being excreted or metabolized and serving as a source of food and energy. Insofar as the polypeptides of this invention are composed of a class of amino acids which occur in peptide linkage in nature and are generally susceptible to the metabolic processes of the human body, they are capable of satisfying this qualification.

In carrying out the process of the invention, the high molecular weight glutamic acid polypeptide as described above or other long chain polycarboxylic amino acid polypeptide, constituting the backbone chain, is esterified under such conditions that there is substantially no degradation of the molecule. The esterified polypeptide is then reacted with hydrazine to form a hydrazide, and the hydrazide is reacted with nitrous acids to form the corresponding azide. The azide is then treated with the selected material forming the side chains. This side chain material must possess a free amino-group in order to form the desired peptide linkage.

The general reactions which take place in the preparation of the conjugated polypeptide polymers of this invention for convenience can be illustrated by the following equations:

In the polypeptides attached as side chains X may have a lower value than in the backbone chains, as, for example, about 15 to 40, and still produce a product useful as a blood plasma extender. Products having a longer half-life in the blood stream are produced, however, where the value of X in the side chain is increased, as for example, to about 100. The large number of ionizable groups in the molecule prepared by these reactions will be readily apparent.

One reaction for preparation of glutamyl polypeptide

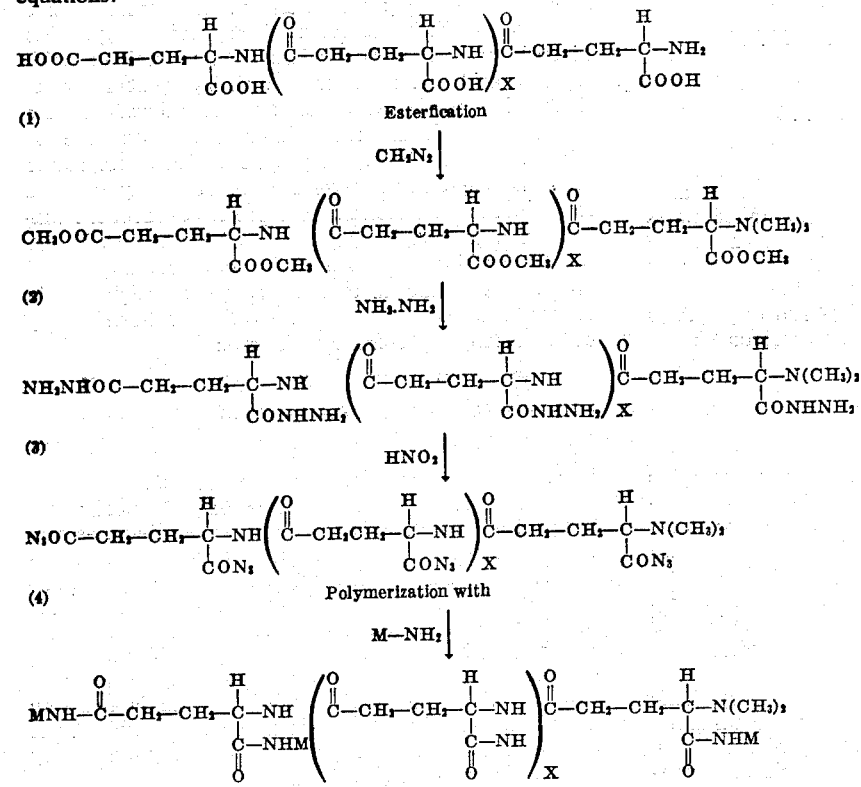

in which X may be a value of at least about 15 and preferably is in the order of 300 to 400 or higher, and in which M is any suitable side chain, preferably a long chain glutamyl or aspartyl polypeptide polyester having a free terminal amino group.

Where the side chain M comprises an ester of a long-chain polypeptide, the material is further treated with NaOH to saponify the ester groupings and produce ionizable groups on the chain. This reaction with the side chain may be represented as follows:

esters of lower molecular weight, suitable for conjugation with the azide of the higher molecular weight backbone chain, may be represented as follows:

in which X may originally have a value within the range of about 80 to 120 and after esterification may have a value within the range of from 15 to 40. The value of X is lower in the esterified product due to degradation of the molecule in carrying out this method of esterification.

PREPARATION OF GLUTAMIC ACID POLYPEPTIDE

High molecular weight glutamic acid polypeptide preferably utilized by this invention as a backbone material may be prepared by my process described in the Journal of Biological Chemistry, vol. 145, No. 2, October 1942, pages 415-424. According to this process a strain of *Bacillus subtilis* known to produce glutamyl polypeptide, such as Strain 41,259, is grown for seven days on Sauton's medium maintained at a temperature of 34° C. Sauton's medium is made as follows: A tap water solution containing 4 gm. of glutamic acid, 2 gm. of citric acid, 0.5 gm. of $K_2HPO_4$, 0.05 gm. of ferric ammonium citrate, 5 ml. of a 10 per cent solution of magnesium sulfate, and 20 gm. of glycerol is adjusted to pH 7.4 with strong ammonia. The whole is diluted with tap water to 1 liter, dispensed into a 3 liter Erlenmeyer flask, and sterilized by autoclaving at 121° C. for fifteen minutes.

It has now been discovered that greatly improved yields of glutamyl polypeptide are produced by adding calcium ion is evidenced by the following data:

| Concentration of calcium in milligrams percent | Grams of copper salt of glutamyl polypeptide produced in 30 cc. of culture medium in seven days |
| --- | --- |
| 0.0 | 0.007 |
| 3.3 | 0.102 |
| 33 | 0.144 |
| 100 | 0.068 |

Distilled water was used in the place of tap water in these experiments.

I have found further that other organic acids such as fumaric, maleic and aspartic acids can be substituted for glutamic acid in the culture medium. These are converted to glutamic acid polypeptide by the bacterial action during the incubation period.

After seven to fourteen days of growth on the modified Sauton's media at 25° C. the organisms are removed by filtration through a suitable filter medium, such as Celite, and the peptide is precipitated from the filtrate by addition of copper sulphate. Immediately following the precipitation sufficient glacial acetic acid is added with stirring to bring the pH to about 3.0. Immediately afterwards the rubbery copper precipitate is collected and washed a few times with water until it begins to become crumbly. The wet copper precipitate is then vigorously stirred with one liter of 0.5 molar citric acid per 100 grams of precipitate until everything has dissolved with the exception of some flocculent white precipitate. This precipitate is removed by filtration and copper removed from the filtrate by saturation with hydrogen sulfide in the presence of 22 grams of sodium chloride per 100 grams of copper. The salt is added toward the end of $H_2S$ saturation. The copper sulfide is filtered as rapidly as possible and sufficient concentrated hydrochloric acid is then added to the filtrate to make it half (0.5) normal. Peptide precipitates out on standing. It is washed with water, alcohol, and ether, and purified by re-dissolving in sodium bicarbonate solution, filtering, and re-precipitating with acid. This produces glutamyl polypeptide of an average molecular weight of about 10,000 to 25,000. Deep fermentation is feasible and yields glutamyl polypeptide of larger molecular weight.

I have found that the product obtained by conjugating glutamyl polypeptide side chains of average molecular weight of 3000 or above with backbones prepared from polyglutamic and of molecular weight of 45,000 or above gives a final product having a suitable half-life in the blood stream of humans.

ESTERIFICATION OF POLYPEPTIDE

The selected polypeptide such as the glutamyl polypeptide may be esterified in a number of ways. One method, using diazomethane as illustrated by Reaction 1 above, leads to esterification with substantially no degradation and thereby preserves the desirable long-chain high molecular weight backbone structure, but unless carried out under special conditions methylates the terminal amino group of the peptide. By observing proper reaction conditions as hereinafter described, it has been discovered that methylation can be accomplished by this method with a minimal methylation of the terminal amino groups. Thus, a material may be produced in which the amino groups are methylated only to the extent of about 20 percent or less. Polypeptide esters formed by either method may be utilized in forming the azide but the specially prepared material must be used as side chain for reaction with the azide to form the conjugated product.

Another method of esterification, using methanol and HCl as illustrated by Reaction 6 above produces polypeptide esters with some degradation so that the average molecular weight, estimated by formol titration, is relatively low. This method has the advantage, however, of leaving all of the terminal amino groups of the peptide molecule intact.

A third method of esterification comprises the use of concentrated sulfuric acid and methanol. While this method produces a polypeptide ester with very little degradation, it is more difficult to use than the other methods.

It will be understood that the invention in its broad aspects encompasses the use of any one of the foregoing methods of esterification and attachment of side chains to backbone by peptide or other linkage as well as other methods that may occur to one skilled in the art. The method utilizing diazomethane is preferred in the preparation of the backbone polyazide, since it entails no degradation of the chain during the esterification, and permits preparation of conjugated polypeptide polymers of desirably large molecular dimensions and configuration for use as blood substitutes which have a relatively long half-life in the blood stream.

The method of esterification will be more fully described in connection with the following examples:

Example 1

*Preparation of polyester with diazomethane.*—An excess of ethereal diazomethane, prepared in the usual fashion from nitrosomethyl urea, is added to a suspension of glutamyl polypeptide in ether containing 5 percent methanol. Best results are obtained with stirring at room temperature. On completion of the reaction, as indicated by disappearance of free carboxyl groups in an ether washed aliquot of the peptide, the excess diazomethane is discharged by addition of dilute ethereal acetic acid. The polyester is filtered off, washed with ether and dried at room temperature in vacuo. It is a white water soluble powder. The extent of esterification can be estimated by titrating residual free carboxyl groups with dilute alkali in an aqueous solution. The terminal amino groups of the peptide have been methylated by this procedure to the extent that the material cannot properly be used as side chain for conjugation with the subsequently formed azide. Recovery is usually around 100 percent.

Example 2

*Preparation of ester with diazomethane with minimal methylation of terminal amino groups.*—In preparation of this material, it has been discovered that the moisture content of the glutamyl polypeptide must be regulated to about 10 to 12 per cent. Glutamyl polypeptide of this moisture content is suspended in 10 times its volume of anhydrous ether instead of methanolic ether as used in Example 1. A two-fold excess of ethereal diazomethane is added to the suspension. The reaction temperature is maintained at about 3° C. to 5° C. and the material is permitted to react for about one to two hours. On completion of the reaction as evidenced by 60–70 percent methylation of carboxyl groups, the excess diazomethane is discharged by addition of dilute alcoholic acetic acid, the insoluble ester is filtered and dried with ether as before. By controlling the moisture content of the starting material and the reaction medium, the reaction temperature and time, it is possible to limit methylation of the terminal amino groups to about 20 percent or less.

*Example 3*

*Preparation of ester with methanol and HCl.*—Dry HCl gas is run into a suspension of 10 gm. of glutamyl polypeptide in 500 cc. of dry methanol (reagent grade) until the concentration of HCl is 7 normal. The reaction mixture is cooled in an ice bath while the HCl is being run in, then allowed to stand at room temperature overnight. Precautions are taken to keep the solutions dry. The solution is concentrated to 100 cc. by evaporation in vacuo using an apparatus fitted with drying traps. A syrupy mixture of peptide, alcohol and HCl is obtained. On addition of anhydrous ether the ester separates as an oil which is repeatedly dissolved in methyl alcohol and precipitated with dry ether until a solid product is obtained. The product is a water soluble white powder. This is inhomogeneous with respect to its solubility in pyridine. Whether this inhomogeneity is due to molecular size, incomplete esterification or some form of internal reaction or rearrangement has not yet been determined. However, the pyridine insoluble is regularly of higher molecular weight than the pyridine soluble. That portion of the ester which is pyridine soluble is conveniently used for the polymerization, although, if desired, any part or all of the ester may be used. The average molecular weight of this pyridine soluble fraction of the ester, as determined by formol titration of the free amino groups should be about 3000–4000.

This average molecular weight varies if the conditions of esterification are altered. Increasing the concentration of HCl, the length of reaction or the temperature decreases the size of the resultant ester. For example, a pyridine soluble polyester having an average molecular weight up to about 5000 may be prepared by this method.

*Example 4*

Glutamyl polypeptide ester with free terminal amino groups can also be prepared by dissolving the glutamyl polypeptide in concentrated sulfuric acid, keeping the temperature at zero or below, and then adding the sulfuric acid solution of the peptide to absolute methanol with stirring and cooling. After letting the solution stand overnight most of the sulfuric acid is removed by addition of sodium bicarbonate and filtration of the sodium sulfate. The alcohol solution is concentrated and the ester precipitated out by addition of ether. The length of the ester will vary with the amount of water present and other conditions of the reaction. Pyridine soluble glutamyl polypeptide ester of an average molecular weight of, for example, 8000 to 9000 may be prepared by this method. The operating difficulties make this method less preferable to the other methods of esterification.

PREPARATION OF HYDRAZINE AND AZIDE FROM PEPTIDE ESTER

The glutamyl polypeptide ester prepared in such a manner that there is no degradation of the molecule is preferably employed for preparation of the hydrazide and azide in order that a final product may comprise material of the desired molecular size. Accordingly, the glutamyl polypeptide esters prepared by the methods of Example 1 above, are preferred as the starting materials for these intermediate compounds. Polypeptide ester of an average molecular weight of about 40,000 or above may be employed, however, regardless of its method of preparation when side chains of 3000 to 4000 are used. Material of lower average molecular weight, as for example, that prepared by the method of Example 3 could also be used as backbone in the process but the final product would be of limited value as a blood substitute due to its possible short half-life in the blood stream. The lower molecular weight material, however, may be used as an intermediate in building up large size molecules by other means. For example, the azide of this material could be conjugated with the high molecular weight side chain material of Example 2 to build up a molecule of different dimensions. The following example is illustrative of the method for forming the hydrazide and azide of these peptides.

*Example 5*

Glutamyl polypeptide ester prepared by the diazomethane method of Example 1 is added to ten to fifteen times by weight of a 50 percent solution of anhydrous hydrazine in methyl alcohol. The reaction is complete in about one hour. The product is then precipitated by the addition of further alcohol, the precipitate is filtered and is finally washed with ether. The hydrazide product should be entirely soluble in water and give a water clear solution. Should any water insoluble material be associated with the hydrazide at this point it may be removed by centrifugation.

A solution of one gm. of the polypeptide hydrazide in 40 cc. of 0.9 N HCl is maintained at $-10°$ C. to $0°$ C. in a suitable bath. To this is added with stirring a slight excess of a 10 percent solution of sodium nitrite. A white precipitate appears almost immediately which coagulates on swirling the solution. This is filtered, maintaining the temperature at about $0°$ C., and washed once in cold water. It is immediately dissolved in 20 cc. of previously cooled anhydrous pyridine (distilled over KOH) to which a few gms. of anhydrous sodium sulfate has been added. Azides of the other polypeptide esters may be prepared in a similar manner.

CONJUGATION OF POLYPEPTIDE AZIDE TO FORM POLYMERS

The glutamyl polypeptide azide prepared in the manner described in Example 5, or in other manner as may be apparent to one skilled in the art, is now conjugated with suitable material for building up the size of the molecule by attachment of side chains. While various side chains may be attached to the backbone polypeptide chain by conjugation with the azide, the glutamyl polypeptide esters having free terminal amino groups as prepared by the processes described in Examples 2 and 3 are preferred because they permit the production of polymers having the desired molecular dimensions and large number of ionizable groups on the molecule surface thereby making them highly suitable for blood plasma extenders. For example, by using the material of Example 3 for conjugation with an azide prepared by Example 5, a polymer may be produced which has a useful half-life of about 7 hours when injected into the blood stream in a saline carrier and is excreted to the extent of 50 percent (of total injected) in twenty-four hours. By using the higher molecular weight undegraded peptide ester of Example 2 for conjugation with the azide of Example 5 polymers may be produced which have an even longer useful half-life in the blood stream. Also by increasing the length of the backbone azide chain as prepared by Example 5, and attaching side chains prepared by Example 3, the half-life of the conjugate in the blood stream may be increased. Conjugation of the glutamyl polypeptide azide with the peptides containing free amino groups may be carried out in any desired manner of which the following example is illustrative.

*Example 6*

To a pyridine solution of the polypeptide azide containing sodium sulfate, as prepared by the procedure of Example 5, is added a previously prepared solution of 10.1 gm. of the pyridine soluble peptide methyl ester which was prepared with HCl and methanol in the manner described in Example 3 above. From 0.3 to 0.75 mol. of this ester per azide group is used. To the combined solutions is added 3.0 cc. of triethyl amine. After thorough mixing, the solution is allowed to stand overnight at room temperature and is then decanted from the sodium sulfate. On addition of ether the product separates as a solid, or sometimes as an oil. In the latter case, resolution in methyl alcohol and reprecipitation with anhydrous ether produces a solid. The extent of conjugation can be estimated by a comparison of the formol titration before and after the reaction.

The conjugate is now dissolved in about ten times its weight of water and is saponified by the addition of a very slight excess of 2.0 N. NaOH. Saponification is carried out for about one to three minutes at 0° C. This removes at least 90 percent of the methyl groups on the side chains by replacing them with sodium and the NaOH also reacts with any unmethylated or free COOH groups. Saponification in this manner does not destroy any of the conjugating peptide linkages. The solution resulting from saponification is then dialyzed against 0.2 N. HCl at low temperature to remove dialyzable material. Any unconjugated material can be separated from the polymer product by fractional precipitation of the sodium salt in alcoholic saline, or by ultrafiltration with suitable filter membranes.

The glutamyl polypeptide polymer product is characterized by its high molecular weight and by the presence of large numbers of ionized groups on the side chains. The latter is especially advantageous in that it increases the oncotic strength of the molecule in the blood stream by virtue of Donnan effect. For this reason only about one-third of the quantity of the synthetic material may be required to exert the same oncotic pressure in the blood stream as natural blood plasma protein.

Example 7

Side chains of glutamyl polypeptide ester, prepared by the procedure of Example 2, and having an average molecular weight of 12,000–15,000, were conjugated with polypeptide azide in pyridine solution, as prepared by the procedure of Example 5. The conjugation and subsequent steps were carried out as earlier in Example 6. The product was characterized by its high molecular weight and by its long life in the blood stream.

STUDIES OF HALF-LIFE OF GLUTAMYL POLYPEPTIDE AND ITS POLYMERS IN THE BLOOD STREAM OF HUMANS AND OF THEIR EXCRETION IN THE URINE OF HUMANS

The materials tested (Figs. 1, 2) were glutamyl polypeptide, and its polymers prepared as described above in Example 6 from azide prepared as in Example 5 and side chains as in Example 3. The glutamyl polypeptide designated as unpolymerized peptides had molecular weight of 12,000–15,000 as determined by formol titration. The two polymers designated A and B had backbones prepared from starting peptide of molecular weight of approximately 12,000–15,000, and side chains of molecular weight 4600 and 2300 respectively.

The materials were injected intravenously as 3 percent solutions of the sodium salt in isotonic saline. Sterilization was achieved by filtration. All solutions were routinely tested for pyrogenicity and sterility prior to use. Each subject was administered 3 gms. of the material being tested during the course of one hour. Control analysis for blood and urine level were taken prior to injection. Blood levels were taken ten minutes after the end of injection, and then at suitable intervals. Urinary excretion of the material was determined from the start of the injection and followed at least twenty-four hours.

The results are shown in the accompanying figures in which:

Fig. 1 is a graph showing the blood level of the peptides and polymers for a period of twenty-four hours after injection.

Fig. 2 is a graph showing the urinary excretion of the peptides and polymers for a period of twenty-four hours after injection.

It is evident from Fig. 1 that the half-life of the glutamyl peptide polymers in the human blood stream is greatly in excess of that of the unpolymerized peptides. As a corollary it may be seen from Fig. 2 that the rate at which the polymerized material is excreted in the urine is much less than that of the unpolymerized peptides. There was no change in temperature, pulse, blood pressure or respiration in either subject during the course of administration or at any time afterwards. Subjectively the patients experienced no symptoms whatsoever.

A further test was conducted with a conjugate prepared as in Example 7 with side chain prepared as in Example 2. During twenty-four hours after injection of this material only 25–30 percent was excreted in the urine. After twelve hours the blood level was about 25 percent of that ten minutes after injection. The sedimentation rate of this material was 1.2(1) S at a concentration of 1.0 percent in 1.4 molar sodium chloride, pH 6.5.

The results of these tests show that attaching side chains to a backbone polypeptide in the manner described herein increases its half-life in the blood stream to a useful value.

Similarly by this and other methods of peptidization, as will be apparent to one skilled in the art, various branches or side chains can be attached to the backbone chain to give polymers of desired properties.

Further polymers of the polyglutamic acid series prepared by the general method of Example 5 have been tested clinically with respect to extent and duration of plasma volume expanding properties, retention of plasma levels of expander, rate of excretion in the urine, oncotic efficiency, and absence of toxicity as manifested by observations on blood pressure, temperature, pulse, respiration, effects on formed elements of the blood including red cells, white cells, platelets, and on the bleeding and clotting times.

The results in regard to plasma expansion are seen in the following table:

TABLE I.—PLASMA VOLUME EXPANSION BY VARIOUS SIZED POLYMERS

| Polymer | Dose, gm. | Molecular Weights of Backbones | | | | Molecular Weight of Side Chains | Plasma Volumes—Dye Method | | | |
|---|---|---|---|---|---|---|---|---|---|---|
| | | Upper Limit | | Lower Limit | | | Pre., 0 hr., ml. | Post Infusion | | $\frac{6 \text{ hr, Expansion}}{1 \text{ hr, Expansion}} \times 100$ |
| | | Mol. wt. | Percent | Mol. wt. | Percent | Entire Mol. wt. | | 1 hr., ml. | 6 hr., ml. | |
| #51 | 27.2 | 65,000 | 8.5 | 13,000 | 11 | 34,000 | 3,000 | 2,680 | 3,580 | 3,100 | 47 |
| #52 | 23.2 | 32,000 | 15 | 12,000 | 10 | 24,000 | 3,000 | 2,780 | 3,840 | 3,220 | 42 |
| #55 | 25.5 | 64,000 | 5 | 38,000 | 25 | 46,000 | 3,200 | 3,190 | 3,980 | 3,790 | 76 |
| #56 | 22.2 | 49,000 | 6 | 31,000 | 6 | 38,600 | 3,000 | 4,170 | 4,850 | (lost) | — |
| #57 | 19.4 | 49,000 | 6 | 31,000 | 6 | 38,600 | 2,100 | 3,390 | 4,180 | 3,800 | 52 |
| #58 | 23.6 | 67,000 | 6 | 18,000 | 6 | 42,900 | 2,500 | 3,050 | 3,730 | 3,480 | 63 |
| #59 | 23.5 | 67,000 | 6 | 18,000 | 6 | 42,900 | 3,400 | 2,880 | 3,670 | 3,600 | 90 |

Bearing in mind the fact that a value of 70 percent for the ratio of the 6 hr. expansion value to the 1 hr. expansion value represents a half life of 15 hours, it can be seen that the products of conjugation prepared from starting backbone of approximately 45,000 molecular weight and side chains of 3000-4000 molecular weight quite satisfactorily give expansion of 15 hrs. half life.

The satisfactory maintenance of blood level of the expander and the small rates of urinary excretion are shown in the following table:

TABLE II.—PLASMA LEVELS AND URINARY EXCRETION OF POLYMERS

| Polymer | Dose, gms. | Hours Post Infusion | Plasma Level, mgm./ml. | Total Plasma Polymer,[1] gm. | Percent Decrease from 1-6 hrs. | Cumulative Urinary Excretion, percent of total infused |
|---|---|---|---|---|---|---|
| #51 | 27.2 | 1 | 6.4 | 23 | | 3.1 |
| | | 6 | 5.3 | 16.5 | 28 | 8.8 |
| | | 20 | | | | 11.6 |
| #52 | 23.2 | 1 | 5.2 | 20 | | 6.6 |
| | | 6 | 3.8 | 12.2 | 39 | 28.4 |
| | | 20 | | | | 41 |
| #55 | 25.5 | 1 | 4.9 | 19.5 | | 3.9 |
| | | 6 | 3.8 | 14.4 | 26 | 8.6 |
| | | 20 | | | | 16.5 |
| #56 | 22.2 | 1 | 4.0 | 19.4 | | 9.0 |
| | | 6 | 3.3 | | | 15.7 |
| | | 20 | | | | 26.6 |
| #57 | 19.4 | 1 | 4.0 | 16.7 | | 10.3 |
| | | 6 | 3.0 | 11.4 | 31 | 18.5 |
| | | 20 | | | | 29 |
| #58 | 23.6 | 1 | 4.9 | 18.2 | | 10.6 |
| | | 6 | 3.3 | 11.6 | 36 | 17.4 |
| | | 20 | | | | 30 |
| #59 | 23.5 | 1 | 5.9 | 21.6 | | 10.6 |
| | | 6 | 4.6 | 16.6 | 23 | 21 |
| | | 20 | | | | 30 |

[1] Total plasma polymer=mgm./ml.×plasma volume obtained by Evans Blue Method.

The oncotic efficiency of the expanders in vivo, as shown in the following table, is manifested by the retention in the blood stream of approximately 52 ml. of fluid per gram of polymer present. For comparison it may be noted that human serum albumin, which exerts essentially all of the oncotic pressure in the normal blood stream, retains 16-17 ml. of fluid per gram of albumin. The polymer is, therefore, three times as potent as human serum albumin.

TABLE III.—FLUID RETAINED IN PLASMA BY POLYMER

| Polymer | Time | Plasma Protein, gm./l. | Plasma Polymer, mgm./ml. | Fluid Retained/gm. Polymer, ml. |
|---|---|---|---|---|
| 51 | 0 | 69.0 | 0 | |
| | 1 | 48.5 | 6.4 | 47 |
| | 6 | 53.8 | 5.3 | 42 |
| | 20 | 57 | 3.8 | 46 |
| 52 | 0 | 70 | 0 | |
| | 1 | 51 | 5.2 | 52 |
| | 6 | 53 | 3.8 | 64 |
| | 20 | 66 | 2.3 | 25 |
| 55 | 0 | 69.5 | 0 | |
| | 1 | 52 | 4.9 | 51 |
| | 6 | 51 | 3.8 | 70 |
| | 20 | 60 | 3.00 | 46 |
| 56 | 0 | 70.5 | 0 | |
| | 1 | 54 | 4.0 | 58 |
| | 6 | 59.8 | 3.3 | 49 |
| | 20 | 62 | 2.0 | 61 |
| 57 | 0 | 69 | 0 | |
| | 1 | 54 | 4.0 | 54 |
| | 6 | 57.8 | 3.0 | 54 |
| | 20 | 63.8 | 1.99 | 38 |
| 58 | 0 | 68 | 0 | |
| | 1 | 48 | 4.9 | 60 |
| | 6 | 51.4 | 3.3 | 74 |
| | 20 | 58 | 2.92 | 50 |
| 59 | 0 | 68.5 | 0 | |
| | 1 | 50 | 5.9 | 46 |
| | 6 | 52.5 | 4.6 | 51 |
| | 20 | 61 | 3.0 | 37 |
| Average | | | | 51 |

None of the patients showed any significant deviation from normal in any of the clinical tests mentioned above and all continued in the same general state of health as prior to the test.

While the specific examples have been directed to the preparation and use of polypeptides of glutamic acid, it will be understood that polypeptides of other polycarboxylic amino acids such aspartic acid, hydroxy glutamic acid and alpha amino adipic acid can be used and some of the advantages of my invention will be retained.

By the procedure described a new class of compounds is formed which comprises a polypeptide polymer having a backbone of a chain of carboxylic acids such as polyglutamic and polyaspartic acid on to which are attached side chains. The side chains are attached to the backbone by means of peptide linkages between the free carboxylic groups of the backbone polycarboxylic acid chain and the terminal amino groups of the polycarboxylic acid side chain. Alternatively the polypeptide polymers may comprise a backbone of a chain of carboxylic acids such as polyglutamic or polyaspartic acids onto which are attached side chains composed of either one of the polyglutamic or polyaspartic acids. For example, the backbone may be a chain formed of polyglutamic acid onto which is attached a side chain composed of polyaspartic acid. Alternatively the backbone may be a chain formed of polyaspartic acid onto which is attached a side chain composed of polyglutamic acid. The side chains in any case are attached to the backbone by means of peptide linkages between the free carboxyl groups of the backbone polycarboxylic chain and the terminal amino group of the polycarboxylic acid side chain.

It will be appreciated from a reading of the foregoing specification that the invention herein described is susceptible of various changes and modifications without departing from the spirit and scope thereof.

What is claimed is:

1. As a new class of compounds, polypeptide polymers having backbone chains of about 12,000 to 67,000 molecular weight which are chains of carboxylic acids of the class consisting of polyglutamic and polyaspartic acids onto which are attached side chains of about 2100 to 3400 molecular weight, of the class consisting of peptides of polyglutamic and polyaspartic acids, the side chains being attached to the backbone chains by means of peptide linkages between the free carboxyl groups of the backbone polycarboxylic acid chains and the terminal amino groups of the polycarboxylic acid side chains.

2. As a new class of compounds, glutamyl polypeptide polymers having backbone chains of polyglutamic acid of about 12,000 to 67,000 molecular weight onto which are attached side chains which are of about 2100 to 3400 molecular weight, themselves composed of polyglutamic acid, the side chains being attached to the polyglutamic acid backbone chains by means of peptide linkages between the free carboxyl groups of the backbone polyglutamic acid chains and the terminal amino groups of the polyglutamic acid side chains.

3. A glutamyl polypeptide polymer according to claim 2 in which the backbone chains have a molecular weight of about 12,000 and the side chains have a molecular weight of about 3,000.

4. A glutamyl polypeptide polymer according to claim 2 in which the backbone chains have a molecular weight of about 34,000 and the side chains have a molecular weight of about 3,000.

5. A glutamyl polypeptide polymer according to claim 2 in which the backbone chains have a molecular weight of about 67,000 and the side chains have a molecular weight of about 3,400.

6. The process of forming a polypeptide polymer having backbone chains of about 12,000 to 67,000 molecular weight made up of polycarboxylic acid of the class consisting of glutamic acid and aspartic acid onto which are attached side chains of about 2,000 to 3,400 molecular weight, themselves composed of polypeptides of the class consisting of peptides of glutamic acid and aspartic acid, which comprises forming polyazides of said polycarboxylic acid backbone chains, and reacting said polyazides with peptides of said amino acid having available for reaction free unsubstituted amino groups, whereby side chains of the said polypeptide of amino acid become attached to the backbone via the amino groups of the side chain to obtain the desired polypeptide polymers.

7. The process according to claim 6 in which the backbone chain is polyglutamic acid and the side chain is polyglutamic acid.

8. The process according to claim 6 in which the backbone chain is polyaspartic acid and the side chain is polyaspartic acid.

9. The process according to claim 6 in which the backbone is polyglutamic acid and the side chain is polyaspartic acid.

10. The process according to claim 6 in which the backbone is polyaspartic acid and the side chain is polyglutamic acid.

References Cited in the file of this patent

UNITED STATES PATENTS

| | | |
|---|---|---|
| 2,524,422 | Boothe et al. | Oct. 3, 1950 |
| 2,538,104 | Koninszy et al. | Jan. 6, 1951 |
| 2,545,304 | Pfiffner | Mar. 13, 1951 |

OTHER REFERENCES

Haas et al.: Biochem. J., vol. 25, col. 1472–5 (1931).
Kuhn et al.: Ber. Deut. Chem., vol. 70B, pp. 1333–41 (1937).
Hanby et al.: Biochem. J., vol. 40, XXI (1946).
Isemura et al.: "Nature," vol. 168, pp. 165–6 (1951).
Anson et al.: "Advances in Prot. Chem.," vol. V, pp. 9–10, 41–45 (1949).